US010042893B2

(12) United States Patent
Thurston et al.

(10) Patent No.: US 10,042,893 B2
(45) Date of Patent: Aug. 7, 2018

(54) SYSTEM AND METHOD FOR PERSONAL AND PEER PERFORMANCE RANKING OF OUTDOOR ACTIVITIES

(71) Applicant: Under Armour, Inc., Baltimore, MD (US)

(72) Inventors: Robin Thurston, Austin, TX (US); Kevin Wood, Austin, TX (US); Kevin Callahan, Austin, TX (US); Sebastian Johnck, Oakland, CA (US)

(73) Assignee: Under Armour, Inc., Baltimore, MD (US)

( * ) Notice: Subject to any disclaimer, the term of this patent is extended or adjusted under 35 U.S.C. 154(b) by 410 days.

(21) Appl. No.: 14/068,972

(22) Filed: Oct. 31, 2013

(65) Prior Publication Data
US 2014/0122494 A1 May 1, 2014

Related U.S. Application Data

(60) Provisional application No. 61/720,812, filed on Oct. 31, 2012.

(51) Int. Cl.
A63B 71/06 (2006.01)
G06F 17/30 (2006.01)

(52) U.S. Cl.
CPC ...... G06F 17/3053 (2013.01); A63B 71/0616 (2013.01)

(58) Field of Classification Search
CPC .......... G06F 17/30616; G06F 17/3071; G06F 17/30864; G06F 17/30011; G06F 17/30038

USPC ........................................................ 707/738
See application file for complete search history.

(56) References Cited

U.S. PATENT DOCUMENTS

| | | | |
|---|---|---|---|
| 7,080,065 B1 | 7/2006 | Kothuri et al. | |
| 7,092,846 B2 | 8/2006 | Vock et al. | |
| 7,881,902 B1 | 2/2011 | Kahn et al. | |
| 7,901,292 B1 | 3/2011 | Ulhir et al. | |
| 8,060,337 B2 | 11/2011 | Kulach et al. | |
| 8,112,251 B2 | 2/2012 | Case, Jr. et al. | |
| 8,364,389 B2 * | 1/2013 | Dorogusker ....... | A63B 24/0062 340/427 |
| 8,374,888 B2 | 2/2013 | Earles et al. | |

(Continued)

OTHER PUBLICATIONS

International Search Report and the Written Opinion issued for PCT Application No. PCT/US2013/067834, dated Mar. 28, 2014, 8 pages.

(Continued)

Primary Examiner — Pierre Vital
Assistant Examiner — Andrew N Ho
(74) Attorney, Agent, or Firm — Maginot, Moore & Beck LLP

(57) ABSTRACT

The invention provides a large technological infrastructure to provide a unique comparison of athletic performance using a system. The system can include a unique point system and can compare aggregate athletic performances of different users across different geographical tracks or sections (i.e., Courses). Advantageously, people who cannot do the same course(s) can compete with one another; aggregate performances can be accumulated to give an overall performance metric; and people with differing abilities can compete with one another.

18 Claims, 8 Drawing Sheets

(56) References Cited

U.S. PATENT DOCUMENTS

| | | | |
|---|---|---|---|
| 8,438,038 | B2 | 5/2013 | Cosentino et al. |
| 8,446,275 | B2 | 5/2013 | Utter, II |
| 8,983,637 | B2 | 3/2015 | Glode et al. |
| 2002/0040601 | A1 | 4/2002 | Fyfe et al. |
| 2005/0288154 | A1 | 12/2005 | Lee et al. |
| 2007/0021979 | A1 | 1/2007 | Cosentino et al. |
| 2007/0062279 | A1 | 3/2007 | Chan et al. |
| 2007/0208544 | A1 | 9/2007 | Kulach et al. |
| 2008/0096726 | A1 | 4/2008 | Riley et al. |
| 2008/0096727 | A1* | 4/2008 | Lee .................. A63B 24/0084 482/8 |
| 2009/0076903 | A1 | 3/2009 | Schwarzberg et al. |
| 2009/0088962 | A1 | 4/2009 | Jones |
| 2009/0150178 | A1* | 6/2009 | Sutton ................ G07C 1/22 705/2 |
| 2009/0204597 | A1 | 8/2009 | Mani et al. |
| 2009/0258710 | A1* | 10/2009 | Quatrochi .......... A63B 24/0062 463/43 |
| 2009/0319230 | A1* | 12/2009 | Case, Jr. ............. A63B 24/00 702/182 |
| 2011/0032105 | A1* | 2/2011 | Hoffman .............. G04F 10/00 340/573.1 |
| 2011/0098928 | A1* | 4/2011 | Hoffman ............ A63B 24/0062 702/5 |
| 2011/0124388 | A1* | 5/2011 | Eisner .................. A63K 1/00 463/7 |
| 2011/0179458 | A1* | 7/2011 | Eisner .................. A63K 1/00 725/105 |
| 2011/0197157 | A1 | 8/2011 | Hoffman et al. |
| 2011/0289443 | A1 | 11/2011 | Heaven et al. |
| 2012/0015778 | A1* | 1/2012 | Lee .................. A63B 71/0622 482/8 |
| 2012/0028761 | A1 | 2/2012 | Dorogusker et al. |
| 2012/0116550 | A1 | 5/2012 | Hoffman et al. |
| 2012/0239173 | A1 | 9/2012 | Laikari et al. |
| 2012/0253234 | A1* | 10/2012 | Yang .................. A61B 5/1038 600/595 |
| 2012/0253485 | A1* | 10/2012 | Weast .................. G06F 1/163 700/91 |
| 2012/0253488 | A1 | 10/2012 | Shaw et al. |
| 2012/0254212 | A1 | 10/2012 | Shaw et al. |
| 2012/0254226 | A1* | 10/2012 | Shaw ............... G06F 17/30271 707/769 |
| 2013/0090749 | A1 | 4/2013 | Oswald et al. |
| 2013/0158686 | A1 | 6/2013 | Zhang et al. |
| 2014/0031959 | A1 | 1/2014 | Glode et al. |
| 2014/0156215 | A1 | 6/2014 | Eastman et al. |

OTHER PUBLICATIONS

International Search Report and the Written Opinion issued for PCT Application No. PCT/US2013/073178, dated May 16, 2014, 8 pages.
Office Action for U.S. Appl. No. 13/440,799, dated May 4, 2012, 23 pgs.
Office Action for U.S. Appl. No. 13/077,410, dated Jun. 11, 2012, 23 pgs.
Amendment for U.S. Appl. No. 13/440,799, dated Jul. 26, 2012, 8 pgs.
Amendment for U.S. Appl. No. 13/077,410, dated Aug. 29, 2012, 8 pgs.
Office Action for U.S. Appl. No. 13/440,799, dated Dec. 4, 2012, 29 pgs.
Office Action for U.S. Appl. No. 13/077,410, dated Dec. 6, 2012, 31 pgs.
Veltkamp, Remco C., Shape Matching: Similarity Measures and Algorithms, Jan. 2001, No. UU-CS-2001-03, 16 pgs., Utrecht University, Utrecht, The Netherlands.
Chapman, Robert F. et al., Ground Contact Time as an Indicator of Metabolic Cost in Elite Distance Runners, Medicine & Science in Sports & Exercise, May 2012, vol. 44, pp. 917-925, Journal of the American College of Sports Medicine, Indianapolis, IN (http://www.acsm.org).
Snyder, Kristine L. et al., Energetically optimal stride frequency in running: the effects of incline and decline, The Journal of Experimental Biology 214, pp. 2089-2095, published Jun. 2011, The Company of Biologists Limited, Cambridge, UK.
Milner, Clare E. et al., Biomechical Factors Associated with Tibial Stress Fracture in Female Runners, Medicine & Science in Sports & Exercise, 2006, vol. 38, pp. 323-328, Journal of the American College of Sports Medicine, Indianapolis, IN (http://www.acsm.org).
Office Action for U.S. Appl. No. 13/561,107, dated Oct. 9, 2013, 9 pgs.
Office Action for U.S. Appl. No. 13/561,107, dated May 29, 2014, 9 pgs.
Advisory Action for U.S. Appl. No. 13/561,107, dated Aug. 1, 2014, 3 pgs.
Notice of Allowance for U.S. Appl. No. 13/561,107, dated Nov. 17, 2014, 4 pgs.
International Preliminary Report on Patentability (Ch. I) for International Patent No. PCT/US2013/067834, dated May 5, 2015, 6 pgs.
International Preliminary Report on Patentability (Ch. I) for International Patent No. PCT/US2013/073178, dated Jun. 9, 2015, 6 pgs.
"Segments—A New Tool for Analysis and Competition" [Retrieved on Oct. 15, 2013 from <<http://ridewithgps.com/segments/help>>, 12 pages.
Neil Zhao, "Full-Featured Pedometer Design Realized with 3-Axis Digital Accelerometer," Analog Dialogue 44-06, Jun. 2010, 5 pages.
Toshiki Iso et al., "Gait Analyzer based on a Cell Phone with a Single Three-Axis Accelerometer," NTT DoCoMo Network Laboratories, pp. 141-144.
Martin Eriksson et al., "Wireless Vertical Displacement Measurement During Running Using an Accelerometer and a Mobile Phone," Portuguese Journal of Sports Sciences 11 (suppl. 2), 2011, pp. 863-866, Porto, Portugal.
Bergamini, E., et a., "Estimation of Temporal Parameters During Sprint Running Using a Trunk-Mounted Inertial Measurement Unit," Journal of Biomechanical (2012), 4 pages.
"What are Segments?" [Retrieved on Oct. 15, 2013 from <<https://strava.zendesk.com/entries/20945952-what-are-segments>>].

* cited by examiner

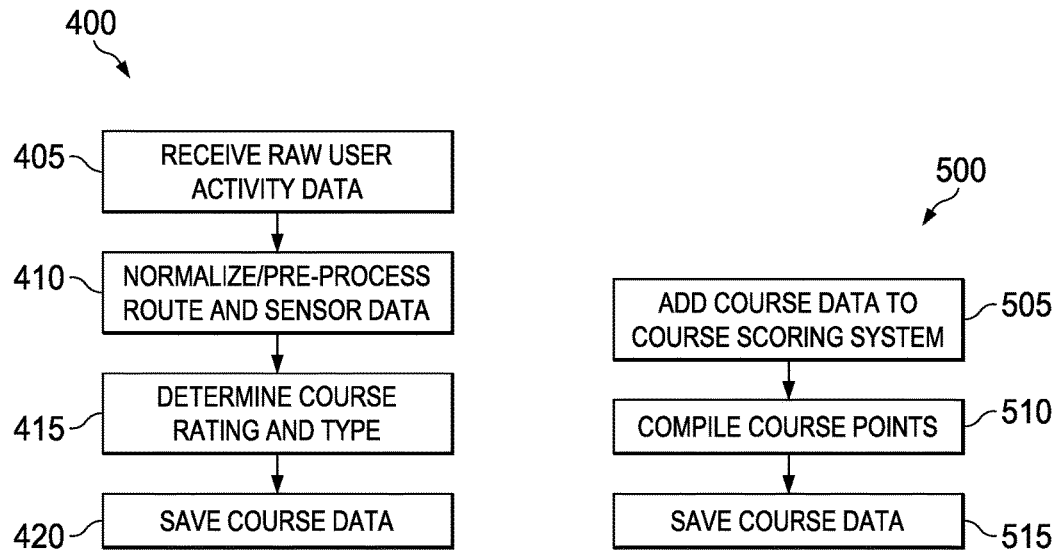
FIG. 4
FIG. 5
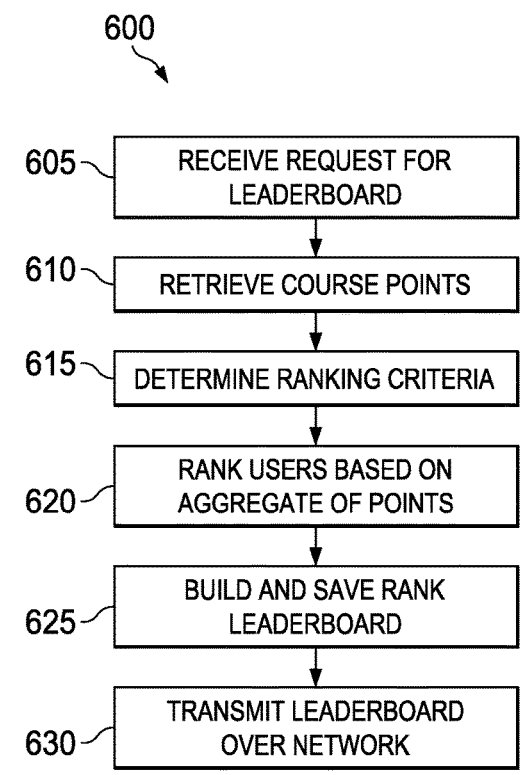
FIG. 6

| HC Climb | | Cat 1 Climb | | Cat 2 Climb | | Cat 3 Climb | | Cat 4 Climb | | Cat 5 Climb | |
|---|---|---|---|---|---|---|---|---|---|---|---|
| Time Rank | Points | Time Rank | Points | Time Rank | Points | Time Rank | Points | Time Rank | Points | Time Rank | Points |
| 1 | 60 | 1 | 50 | 1 | 40 | 1 | 30 | 1 | 20 | 1 | 10 |
| 2 | 59 | 2 | 49 | 2 | 39 | 2 | 29 | 2 | 19 | 2 | 9 |
| 3 | 58 | 3 | 48 | 3 | 38 | 3 | 28 | 3 | 18 | 3 | 8 |
| 4 | 57 | 4 | 47 | 4 | 37 | 4 | 27 | 4 | 17 | 4 | 7 |
| 5 | 56 | 5 | 46 | 5 | 36 | 5 | 26 | 5 | 16 | 5 | 6 |
| 6 | 55 | 6 | 45 | 6 | 35 | 6 | 25 | 6 | 15 | 6 | 5 |
| 7 | 54 | 7 | 44 | 7 | 34 | 7 | 24 | 7 | 14 | 7 | 4 |
| 8 | 53 | 8 | 43 | 8 | 33 | 8 | 23 | 8 | 13 | 8 | 3 |
| 9 | 52 | 9 | 42 | 9 | 32 | 9 | 22 | 9 | 12 | 9 | 2 |
| 10 | 51 | 10 | 41 | 10 | 31 | 10 | 21 | 10 | 11 | 10 | 1 |
| 11 | 50 | 11 | 40 | 11 | 30 | 11 | 20 | 11 | 10 | 11 | 0.5 |
| 12 | 49 | ⋮ | ⋮ | 12 | 29 | 12 | 19 | 12 | 9 | 12 | 0.3 |
| 13 | 48 | | | 13 | 28 | 13 | 18 | 13 | 8 | 13 | 0.2 |
| 14 | 47 | 23 | 28 | 14 | 27 | 14 | 17 | 14 | 7 | 14 | 0.1 |
| 15 | 46 | 24 | 27 | 15 | 26 | 15 | 16 | 15 | 6 | 15 | 0 |
| 16 | 45 | 25 | 26 | 16 | 25 | 16 | 15 | 16 | 5 | | |
| 17 | 44 | 26 | 25 | 17 | 24 | 17 | 14 | 17 | 4 | | |
| 18 | 43 | 27 | 24 | 18 | 23 | 18 | 13 | 18 | 3 | | |
| 19 | 42 | 28 | 23 | 19 | 22 | 19 | 12 | 19 | 2 | | |
| 20 | 41 | 29 | 22 | 20 | 21 | 20 | 11 | 20 | 1 | | |
| 21 | 40 | 30 | 21 | 21 | 20 | 21 | 10 | 21 | 0.5 | | |
| ⋮ | ⋮ | 31 | 20 | 22 | 19 | 22 | 9 | 22 | 0.3 | | |
| | | 32 | 19 | 23 | 18 | 23 | 8 | 23 | 0.2 | | |
| | | 33 | 18 | 24 | 17 | 24 | 7 | 24 | 0.1 | | |
| 44 | 17 | 34 | 17 | 25 | 16 | 25 | 6 | 25 | 0 | | |
| 45 | 16 | 35 | 16 | 26 | 15 | 26 | 5 | | | | |
| 46 | 15 | 36 | 15 | 27 | 14 | 27 | 4 | | | | |
| 47 | 14 | 37 | 14 | 28 | 13 | 28 | 3 | | | | |
| 48 | 13 | 38 | 13 | 29 | 12 | 29 | 2 | | | | |
| 49 | 12 | 39 | 12 | 30 | 11 | 30 | 1 | | | | |
| 50 | 11 | 40 | 11 | 31 | 10 | 31 | 0.5 | | | | |
| 51 | 10 | 41 | 10 | 32 | 9 | 32 | 0.3 | | | | |
| 52 | 9 | 42 | 9 | 33 | 8 | 33 | 0.2 | | | | |
| 53 | 8 | 43 | 8 | 34 | 7 | 34 | 0.1 | | | | |
| 54 | 7 | 44 | 7 | 35 | 6 | 35 | 0 | | | | |
| 55 | 6 | 45 | 6 | 36 | 5 | | | | | | |
| 56 | 5 | 46 | 5 | 37 | 4 | | | | | | |
| 57 | 4 | 47 | 4 | 38 | 3 | | | | | | |
| 58 | 3 | 48 | 3 | 39 | 2 | | | | | | |
| 59 | 2 | 49 | 2 | 40 | 1 | | | | | | |
| 60 | 1 | 50 | 1 | 41 | 0.5 | | | | | | |
| 61 | 0.5 | 51 | 0.5 | 42 | 0.3 | | | | | | |
| 62 | 0.3 | 52 | 0.3 | 43 | 0.2 | | | | | | |
| 63 | 0.2 | 53 | 0.2 | 44 | 0.1 | | | | | | |
| 64 | 0.1 | 54 | 0.1 | 45 | 0 | | | | | | |
| 65 | 0 | 55 | 0 | | | | | | | | |

805 — HC Descents

| Time Rank | Points |
|---|---|
| 1 | 25 |
| 2 | 24 |
| 3 | 23 |
| 4 | 22 |
| 5 | 21 |
| 6 | 20 |
| 7 | 19 |
| 8 | 18 |
| 9 | 17 |
| 10 | 16 |
| 11 | 15 |
| 12 | 14 |
| 13 | 13 |
| 14 | 12 |
| 15 | 11 |
| 16 | 10 |
| 17 | 9 |
| 18 | 8 |
| 19 | 7 |
| 20 | 6 |
| 21 | 5 |
| 22 | 4 |
| 23 | 3 |
| 24 | 2 |
| 25 | 1 |
| Decimal Points To Zero | |

800 / 810 — Cat 1

| Time Rank | Points |
|---|---|
| 1 | 15 |
| 2 | 14 |
| 3 | 13 |
| 4 | 12 |
| 5 | 11 |
| 6 | 10 |
| 7 | 9 |
| 8 | 8 |
| 9 | 7 |
| 10 | 6 |
| 11 | 5 |
| 12 | 4 |
| 13 | 3 |
| 14 | 2 |
| 15 | 1 |
| Decimal Points To Zero | |

815 — Cat 2

| Time Rank | Points |
|---|---|
| 1 | 10 |
| 2 | 9 |
| 3 | 8 |
| 4 | 7 |
| 5 | 6 |
| 6 | 5 |
| 7 | 4 |
| 8 | 3 |
| 9 | 2 |
| 10 | 1 |
| Decimal Points To Zero | |

820 — Cat 3

| Time Rank | Points |
|---|---|
| 1 | 5 |
| 2 | 4 |
| 3 | 3 |
| 4 | 2 |
| 5 | 1 |
| Decimal Points To Zero | |

825 — Cat 4

| Time Rank | Points |
|---|---|
| 1 | 3 |
| 2 | 2 |
| 3 | 1 |
| Decimal Points To Zero | |

830 — Cat 5

| Time Rank | Points |
|---|---|
| 1 | 3 |
| 2 | 2 |
| 3 | 1 |
| Decimal Points To Zero | |

| Courses | 2012 | | | | | | | | | | | | 2013 | | | Type | Multiplier | Sub Total | Course Total |
|---|---|---|---|---|---|---|---|---|---|---|---|---|---|---|---|---|---|---|---|
| | Jan | Feb | Mar | Apr | May | Jun | Jul | Aug | Sep | Oct | Nov | Dec | Jan | Feb | Mar | | | | |
| Shoal Creek | 10 | 0 | 13 | 16 | 16 | 25 | 30 | 25 | 27 | 0 | 10 | 13 | 0 | 0 | 5 | User Created | 1 | 190 | 180 |
| Jester | - | - | 3 | 3 | 0.5 | 9 | 7 | 9 | 10 | 13 | 9 | 9 | 0 | 9 | 10 | User Created | 1 | 91.5 | 91.5 |
| Mt Bonnell | - | - | - | - | 2 | 8 | 8 | 14 | 15 | 18 | 14 | 0 | 5 | 24 | 24 | User Created | 1 | 132 | 132 |
| | | | | | | | | | | | | | | | | Adam A's Overall Points | | | 413.5 |

| Courses | 2012 | | | | | | | | | | | | 2013 | | | Type | Multiplier | Sub Total | Course Total |
|---|---|---|---|---|---|---|---|---|---|---|---|---|---|---|---|---|---|---|---|
| | Jan | Feb | Mar | Apr | May | Jun | Jul | Aug | Sep | Oct | Nov | Dec | Jan | Feb | Mar | | | | |
| Big View | 3 | 3 | 3 | 5 | 0 | 8 | 8 | 13 | 13 | 15 | 18 | 12 | 10 | 0 | 0 | User Created | 1 | 111 | 111 |
| Lime Creek | - | - | - | - | - | - | - | - | - | 6 | 12 | 12 | 18 | 18 | 19 | User Created | 1 | 85 | 85 |
| Lady Bird Lake | 0.5 | 0.5 | - | 1 | 1 | 1 | 1 | - | 1 | 1 | 1 | 1 | 2 | 2 | 2 | Official | 2 | 16.5 | 33 |
| Shoal Creek | - | - | 2 | 2 | 2 | 2 | 4 | 4 | 0 | 0 | 7 | 7 | 7 | 7 | 7 | User Created | 1 | 49 | 49 |
| Cap 10k | - | - | - | - | 10 | - | - | - | - | - | - | - | - | - | - | Event | 3 | 10 | 30 |
| | | | | | | | | | | | | | | | | Evan M's Overall Points | | | 308 |

FIG. 11

SYSTEM AND METHOD FOR PERSONAL AND PEER PERFORMANCE RANKING OF OUTDOOR ACTIVITIES

CROSS-REFERENCE TO RELATED APPLICATION(S)

This is a conversion of, and claims a benefit of priority from U.S. Provisional Application No. 61/720,812, filed Oct. 31, 2012, entitled, "SYSTEM AND METHOD FOR PERSONAL AND PEER PERFORMANCE RANKING SYSTEM OF AGGREGATED OUTDOOR ACTIVITIES," which is fully incorporated herein by reference.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to ranking performances of outdoor activities. More particularly, embodiments disclosed herein relate to a system, method, and computer program product for personal and peer performance ranking of outdoor activities.

BACKGROUND OF THE RELATED ART

There are web based systems that provide "gamification" of fitness and athletic activities through websites by comparing sensor data (GPS, power, heart rate) of a user against past performances and performances of their peers and presenting the resulting comparisons on the websites. These comparisons typically rely on specifically pre-designated GPS defined sections of streets or roads. By using pre-defined routes, these prior web based systems can track individuals and groups and comparing performances of different individuals on the same pre-defined route.

As an example, a website may provide activity segments, which can be a loop, sprints, descents, or time trials. For each of these defined segments, users are compared on the fastest time, and can be broken down by further categories (age, gender, etc.) on each specific segment. Although these segments are said to be "categorized", the categorizations are not used to make quantitative comparisons of users, including quantitative comparisons of users across multiple segments. As another example, a website may provide the ability for direct visual comparison on particular segments, but it must receive compiled data from other source(s). As yet another example, a website may provide loops and climbs, but they are entirely user created, and use a similar leaderboard (compared by speed or overall time). Accordingly, there is room for innovations and improvements in ranking performances of outdoor activities.

BRIEF SUMMARY OF THE DISCLOSURE

Embodiments disclosed herein are directed to a new points-based approach for ranking performances of outdoor activities. The new approach can provide quantitative comparisons for both individuals and groups across multiple segments, thereby encouraging people to improve their performances and maintain a healthy lifestyle. The new approach can be realized via a unique system that can leverage fitness data from disparate data sources, for example, fitness data from GPS-enabled mobile devices. The system can compare aggregate athletic performances across geographical tracks or sections (referred to herein as "Courses"). Within this disclosure, a course may refer to a portion of a route. Tour de France is an example of a route. On the one hand, a route may have multiple courses. On the other hand, multiple courses may exist over multiple routes.

In some embodiments, a method for ranking performances of outdoor activities may include, in response to a request for a leaderboard received from a user device, a performance ranking system retrieving course points associated with a plurality of users of the performance ranking system. The request for leaderboard may contain filter information specifying a particular type of leaderboard desired. The method may further include determining, by the performance ranking system, ranking criteria based on the filter information contained in the request for leaderboard, ranking the plurality of users based on an aggregate of the course points for each of the plurality of users, building the requested leaderboard according to the ranking, and transmitting the requested leaderboard to the user device over a network. The generated leaderboard may be saved and used to serve requests for the same leaderboard. The performance ranking system may be configured for aggregating individual course points for each of the plurality of users on a per course basis within a time interval, using activity data associated with each user. The activity data may be sensed and recorded by various user devices, including networked and/or GPS-enabled devices such as a smart phone. In addition to course points, the performance ranking system may also add non-performance based points, such as achievement or participation rewards. In some embodiments, a total point for each user is used in ranking the users of the performance ranking system within a course, across a plurality of courses, within a geographic area, across multiple geographic areas, or a combination thereof. The method may further include determining a category for each of the plurality of courses as well as determining a maximum available point for the category. The plurality of courses may be classified in various ways, including by type such as official (set by the system), user-created, and event based. In one embodiment, the plurality of courses may include at least a time limited event.

In some embodiments, a method disclosed herein may be embodied in a computer program product comprising at least one non-transitory computer readable medium storing instructions translatable by at least one processor to perform the method. In some embodiments, a system may comprise software and hardware, including at least one processor and at least one non-transitory computer-readable storage medium that stores computer instructions translatable by the at least one processor to perform a method disclosed herein.

Numerous other embodiments are also possible.

Embodiments disclosed herein provide many advantages. For example, embodiments can compare people in aggregation and the aggregate performances can be accumulated to give an overall performance metric (e.g., the best hill runner in a particular geographic area.). This can be done even if they are from different areas (not on the same course). As such, people who do not necessarily have access to the same course or courses can "compete" with one another over different courses. Furthermore, embodiments can reward virtues such as diligence and consistency, allowing people with differing abilities to compete on a "leveled" playing field. In this way, for example, diligence and commitment (e.g., exemplified by multiple performances), can be compared against fewer performances of, potentially, a superior athlete (e.g., a faster athlete tracked over fewer courses).

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 4 depicts a flow diagram illustrating one embodiment of a course determination process;

FIG. 5 depicts a flow diagram illustrating one embodiment of a course scoring process;

FIG. 6 depicts a flow diagram illustrating one embodiment of a method for ranking performances of users based on aggregation of course points;

FIG. 7 shows one embodiment of a table of points for each category of climb that can be used in conjunction with and/or as part of the invention disclosed herein;

FIG. 8 shows one embodiment of a table of points for each category of descent that can be used in conjunction with and/or as part of the invention disclosed herein;

FIG. 11 illustrates by example how individual users may achieve points over different courses according to some embodiments disclosed herein.

DETAILED DESCRIPTION

Figures 1, 9:
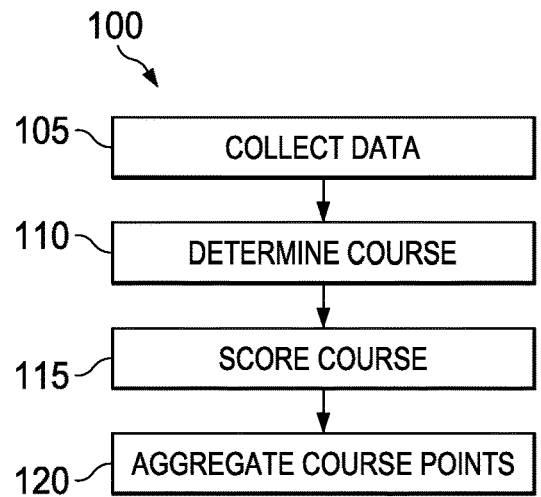
FIG. 1 depicts a flow diagram illustrating one embodiment of a method for tracking performances of outdoor activities.
FIG. 9 shows one embodiment of a table of points for sprints that can be used in conjunction with and/or as part of the invention disclosed herein.

The disclosure and the various features and advantageous details thereof are explained more fully with reference to the non-limiting embodiments that are illustrated in the accompanying drawings and detailed in the following description. Descriptions of well-known hardware and software components, programming languages and programming techniques are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concepts will become apparent to those skilled in the art after reading this disclosure.

Embodiments provide a performance ranking system and method utilizing a unique point structure in which ranking is driven by points. Points can be achieved by a user such as a rider based on various factors: e.g., fastest time, repeat participation (number of times attempted and completed a course), relative score for the difficulty of the course (e.g., per climb type), etc. The number of points available for a user to achieve the number one position on the leaderboard can depend on the climb type of course(s) completed by the user. Further, a special achievement award (e.g., a guru) may be given to a user which gives the user additional points each time the user completes a course. Points are aggregated at a time interval (e.g., monthly) into a point total and used in ranking users on a leaderboard.

In one embodiment, this point aggregation can be done by course per user point aggregation. In one embodiment, this point aggregation can be done across different courses for each user to thereby provide an overall or global leader board encompassing users participating in multiple courses. The multiple courses may differ geographically, for instance, by cities, by states, by countries, by continents, etc. Embodiments may evaluate courses in various geographic locations and assign a value to each course that reflects the efforts needed to complete the course. Comparable courses are those that have the same or substantially the same "effort value." In this way, a user in Maryland can compare his point total with the point total of another user in California, even though they do not participate in identical courses.

Embodiments of a performance ranking system and method disclosed herein may enable temporally closed and fixed competitions in which points are aggregated per time interval. In one embodiment, a leaderboard may reflect a monthly competition in which a competition is closed and fixed monthly and points are aggregated monthly.

Before describing embodiments in detail, it may be helpful to note that several terms used in this disclosure have the following definitions with equivalents when used herein.

Workout: Fitness activities that have associated data—the collected data for a particular activity can be referred to herein as a workout when logged into a performance ranking system implementing an embodiment disclosed herein. A user may refer to an individual who is registered with the performance ranking system.

Route: A route represents an ordered collection of GPS data points (which can be part of a user's workout) that specifies a sequence of geographical points that the user completed or intends to complete, having a starting point and an ending point. A route can be, for example, point-to-point or start and end at the same point.

Course: A course provides a defined geographical route (or a subset of a route) that allows users to challenge themselves, either as individuals or with others, by comparing their performance on a section of a route with others' workouts or their own previous workouts on the same and/or different sections of a route. People often record routes that may differ slightly but want to compare their performance over a common section of the route. A course may refer to this common section of the route.

Courses can initially be defined in two ways:

a. Automatically—for example, generated from geographic points by the systems (e.g., by geographical features such as climbs or descents).
b. User generated—for example, by the user selecting (e.g., via a web or mobile interface with the system), a section of their workout route using, for instance, GPS data.

A course may include the automatically or user-defined Global Positioning System (GPS) points (e.g., latitude and longitude coordinates). A course may also include additional geographical identification metadata such as altitude, bearing, distance, accuracy data, and/or place names, etc. In one embodiment, a course may include a climb/descent rating if a climb/descent rating system is applicable (see below), and a course type.

A course type can include one or more of the following (or other "type" metrics):

c. user-created or automatically-generated;
d. "official" (e.g., as defined by a manually curated database); and/or
e. a special event, such as a marathon or bike race.

These course type classifications can be used, in one embodiment, to designate a multiplier (or weighting factor) when points are accumulated across different courses. Note that courses can be developed from workouts that include GPS data, and their GPS tracks, and can be continuous subsections of a route (e.g., from the workout data). In one embodiment, elapsed time over a course is used to measure performance (and is used as a basis for the point system described below).

In one embodiment, courses can be further classified as follows:

Climb—uphill using the rating system described above.
Descent—downhill using a rating system such as the climb/descent rating system (see below).
Sprint/flats—any other course not classified as either a climb or descent.

Course Awards: In one embodiment, awards are given for courses. The type of awards given is dependent on the type of course. The awards can be for a particular event (such as a virtual race), a period of time (such as a month), or an ongoing award that is held by a user until another user records a better performance. The following represent various examples of the awards that can be given:

Climb King/Queen: The male (king) or female (queen) who has accumulated the most overall points on any official climb course.
Speed King/Queen: The male (king) or female (queen) who has accumulated the most overall points on any official descent course.
Sprint King/Queen: The male (king) or female (queen) who has accumulated the most overall points on any official flat (either a flat loop, a flat out and back, or a flat point to point) course.
Personal Record: A user's best time on a course.
Fastest Time: A user who holds the overall fastest time.
Guru: An individual who has done any course the most times. In one embodiment, the guru achievement can contribute to course points (see section below).
Guru Points: A "guru" represents a user that has done a course the most times regardless of how fast they complete the course. The guru status can be used to provide extra "guru points." As a non-limiting example, in one embodiment, suppose a user has achieved the guru status after the second time completing a course (either by definition in the system or because that is the most a particular course has been completed by any user), the user as guru will receive an additional three points (i.e., "guru points") every time they complete that course afterwards, regardless of his performance. In one embodiment, such "guru points" may be earned by the user in any given month up to a maximum (e.g., 10 times). Guru points can be assigned for all months, and count towards the overall points for the user and the course (or in other ways).

Leaderboard: The leaderboard can include a listing of all or some subset of the users of the system on a particular ranking and category (e.g., female users, users of a particular club, or users within a particular geographic boundary). Leaderboards can be rankings for a particular course or an aggregate of points over a set of courses or particular area, or an aggregate of points over one or more courses for a defined geographic area (such as a city), time interval, etc. For example, a climb can have a leaderboard that ranks the fastest time, separated by gender (and combining genders) but also ranks by overall points accrued every month. The point system allows users who frequent a particular climb to compete with other athletes who may try a climb only once. The climb/descent rating system (described more fully below) also allows competitions over geographical areas. In one embodiment, the system may generate an overall or global leaderboard for users in different geographical areas. Accordingly, embodiments of a system disclosed herein may produce various types of leaderboards using course points earned by multiple users in many different ways within a fixed time period.

Climb/Descent Rating System: A rating system that compares user performances between courses defined by or including climbs, where the climbs can be of different length and steepness. As a non-limiting example, in one embodiment, climbs can be rated by six categories, Category 1 through 5, with 1 being the most difficult, plus an "Hors Categories (HC) or "outside category" which is even more difficult than category one. The categories of this example climb rating system originated with the Tour de France, and have been adopted by many bicycle races around the world. It should be understood that any number of climb/descent rating systems can be used in conjunction with the system and method described herein. While the Tour de France ratings are subjective assessments by race officials, the climb categorizations used in one embodiment of the system and method described herein can be automatically generated using a climb/descent rating algorithm described below.

Courses Point System: Users of the system can earn and accrue points through completions of courses, depending on their relative performance and the classification of the course, and any weighting used (e.g., guru points) and any other additional factors used in the system. Points accumulate throughout a time period (e.g., a month) can be aggregated over a geographical area (e.g., a city) or multiple geographical areas.

Embodiments disclosed herein provides systems, methods, and computer program products for comparing and ranking athletic performances of individuals automatically using GPS (or other sensor) data. In one embodiment, a unique point system embodied on a non-transitory computer readable medium can aggregate points across different courses for multiple users within a defined geographical area or over various geographical areas. The unique point system can track and rank user performances in an aggregate manner across multiple courses within a time period, even though the courses may not be identical.

Turning now to FIG. 1, which depicts a flow diagram illustrating one embodiment of a method for tracking performances of outdoor activities. Method 100 may include collecting data (step 105), determining a course based on the data collected (step 110), scoring the course based on performance (step 115), and aggregating course points in response to a request for a leaderboard (step 120). These steps will be described in detail below with reference to FIG. 2 which depicts a diagrammatic representation of one embodiment of a technological infrastructure for tracking, ranking, and presenting performances of outdoor activities.

Figure 2:
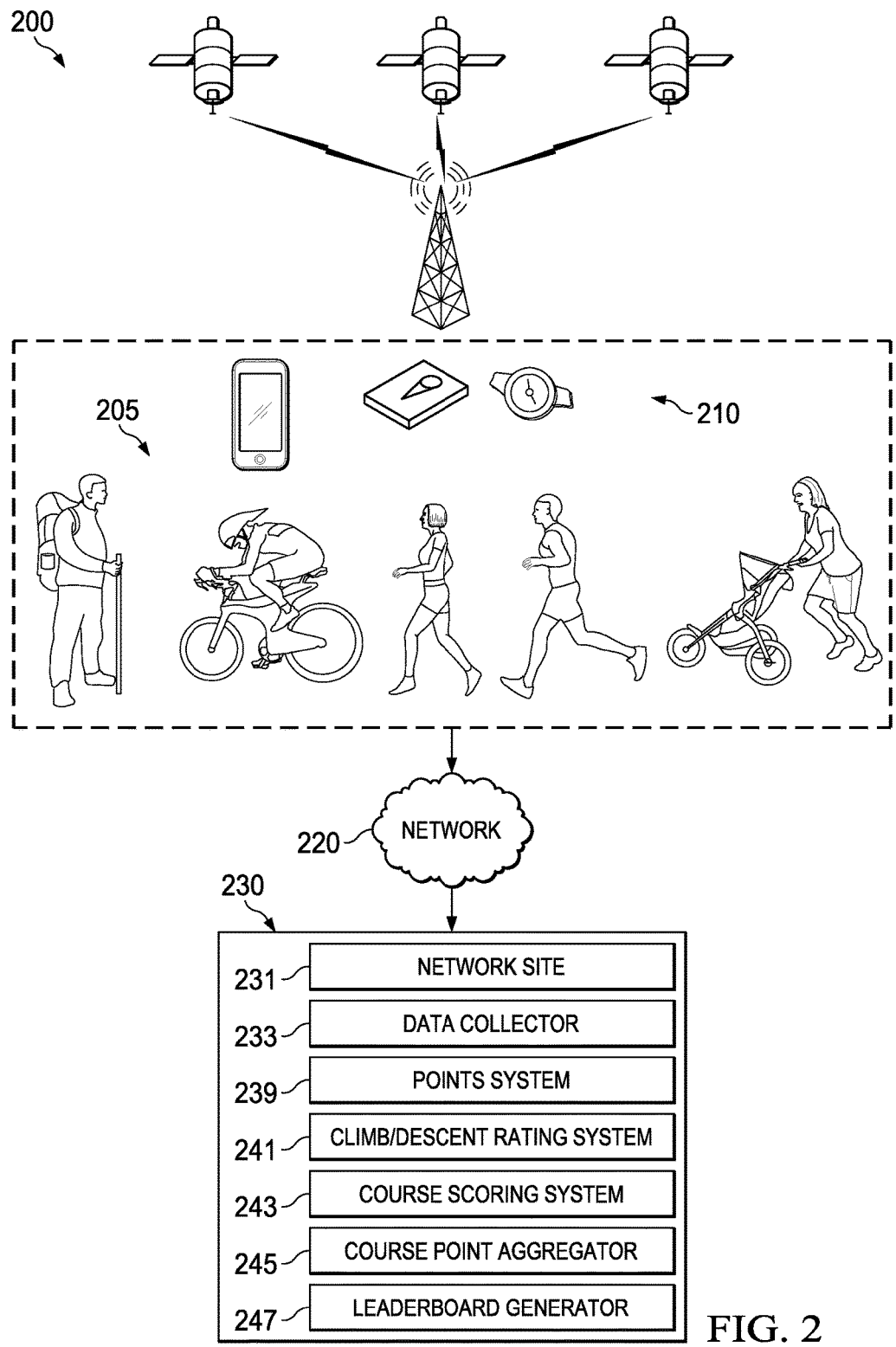
FIG. 2 depicts a diagrammatic representation of one embodiment of a technological infrastructure for tracking, ranking, and presenting performances of outdoor activities.

Data Collection:

As illustrated in FIG. 2, infrastructure 200 may include GPS-enabled devices 210 configured for receiving GPS data from the Global Positioning System satellites, sensing and collecting activity data associated with user 205, and sending the GPS data and the collected sensor data to performance ranking system 230 over network 220 (e.g., the Internet). As an example, the GPS data may include timestamp, latitude, longitude, and elevation. GPS-enabled devices 210 may include GPS receivers. Examples of GPS-enabled devices 210 may include, but are not limited to, smartphones, GPS watches, etc. Sensor data may include actual readings or estimates and may be collected or determined in real time or on a regular basis. GPS-enabled devices 210 may provide information (e.g., power, heart rate, motion, movement, speed, range, etc.) associated with various physical activities.

Figure 3:
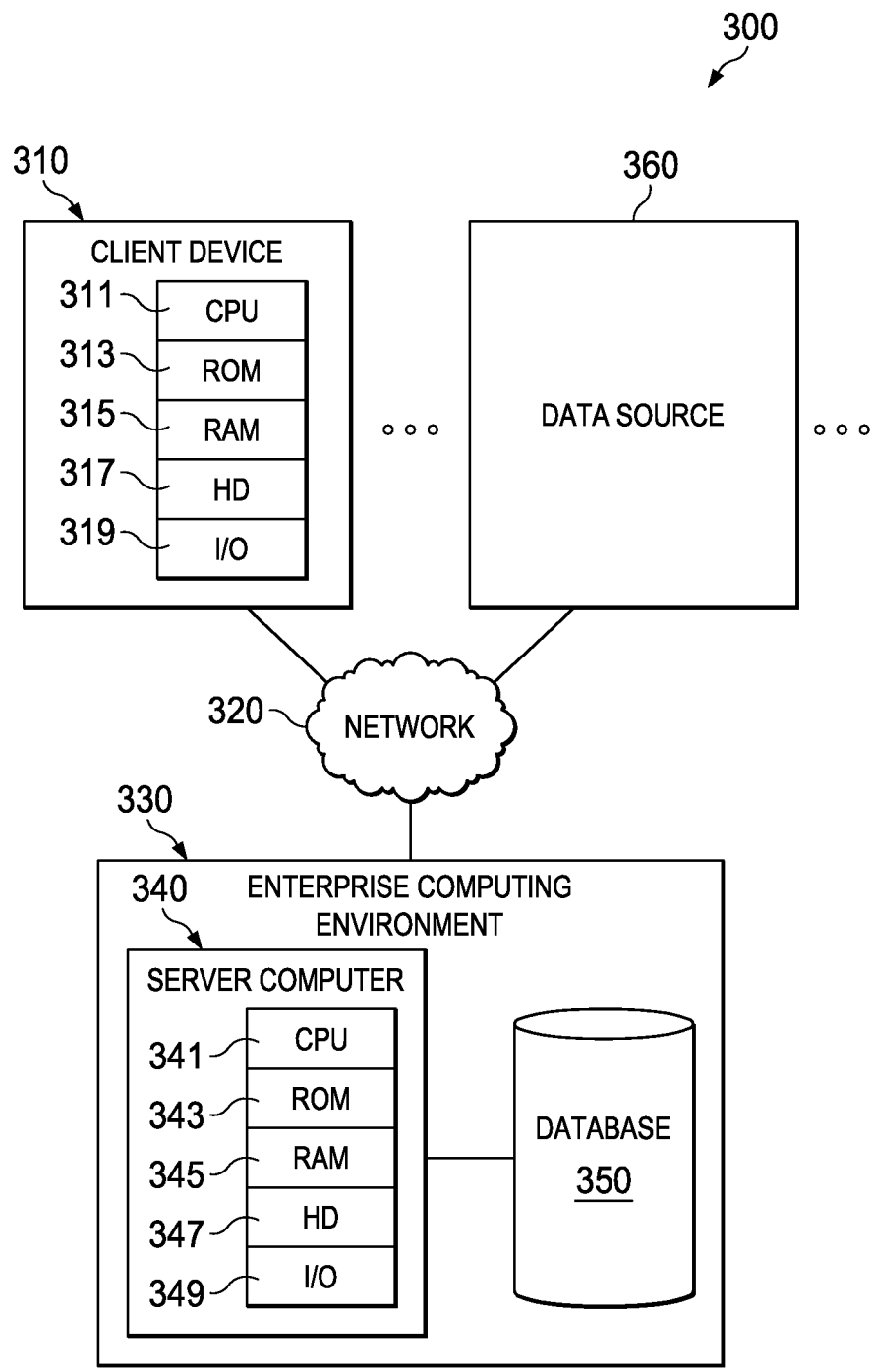
FIG. 3 depicts a diagrammatic representation of one embodiment of a network computing environment in which embodiments disclosed herein may be implemented.

Before proceeding further, it may be helpful to describe a network computing environment in which embodiments disclosed herein may be implemented. Referring to FIG. 3, for purposes of clarity, a single client computer, a single server computer, and a single data source are shown in the figure. The client and server computers and data source represent an exemplary hardware configuration of data processing systems that are capable of bi-directionally communicating with each other over a public network such as the Internet. Those skilled in the art will appreciate that network computing environment 300 may comprise multiple server computers, and multiple client computers and data sources may be bi-directionally coupled to enterprise computing environment 330 over network 320.

Client computer 310 can include central processing unit ("CPU") 311, read-only memory ("ROM") 313, random access memory ("RAM") 315, hard drive ("HD") or storage memory 317, and input/output device(s) ("I/O") 319. I/O 319 can include a keyboard, monitor, printer, and/or electronic pointing device. Example of I/O 319 may include mouse, trackball, stylist, or the like. Client computer 310 can include a cellular phone, a smart phone, a GPS phone, or nearly any device capable of geotagging and communicating over a network. Server computer 340 may have similar hardware components including CPU 341, ROM 343, RAM 345, HD 347, and I/O 349. Data source 360 may be a server computer having hardware components similar to those of client computer 310 and server computer 330, or it may be a data storage device.

Each computer shown in FIG. 3 is an example of a data processing system. ROM 313 and 343, RAM 315 and 345, HD 317 and 347, and database 350 can include media that can be read by CPU 311 and/or 341. Therefore, these types of computer memories include computer-readable storage media. These memories may be internal or external to computers 310 and/or 340.

Portions of the methods described herein may be implemented in suitable software code that may reside within ROM 343, RAM 345, HD 347, database 350, data source 360 or a combination thereof. In some embodiments, computer instructions implementing an embodiment disclosed herein may be stored on a direct access storage device (DASD) array, magnetic tape, floppy diskette, optical storage device, or other appropriate computer-readable storage medium or storage device. A computer program product implementing an embodiment disclosed herein may therefore comprise one or more computer-readable storage media storing computer instructions translatable by CPU 341 to perform an embodiment of a method disclosed herein.

In an illustrative embodiment, the computer instructions may be lines of compiled C++, Java, or other language code. Other architectures may be used. For example, the functions of server computer 340 may be distributed and performed by multiple computers in enterprise computing environment 330 or in a cloud in network computing environment 300. Accordingly, each of the computer-readable storage media storing computer instructions implementing an embodiment disclosed herein may reside on or accessible by one or more computers in enterprise computing environment 330 or in a cloud in network computing environment 300.

Server computer 340 may implement an embodiment of performance ranking system 230 shown in FIG. 2. In one embodiment, performance ranking system 230 may be configured to perform a plurality of functions embodied in various subsystems including, but are not limited to, network site 231, data collector 233, point system 239, climb/descent rating system 241, course scoring system 243, coarse scores aggregator 245, and leaderboard generator 247. Those skilled in the art will appreciate that the example shown in FIG. 2 is non-limiting and that configuration of performance ranking system 230 may vary from implementation to implementation.

Referring to FIG. 2, the GPS data may be received and stored by a user device during an activity by a user (i.e., walking, jogging, running, biking, etc.). This GPS data provides the geographic information of the recorded activity. The user device can optionally record other data, such as the user's heart rate or power, at a varied sample rate (1-100 Hz) depending on the activity type, and any additional information (cadence, stride rate, etc.) as appropriate.

When the activity is completed by the user, the user instructs the device to send the recorded sensor data over network 220 to performance ranking system 230. This can be sent directly if the device (such as a smartphone) has the capabilities. Otherwise, the device may be linked to a networked computer in order to deliver data. The device can provide this time series data for the activity, create a data file that is temporarily stored in memory, and send the data file in a format similar to, but not limited to, the example listed below:

| time | user | lat | lng | elev | (hr) | (power) | (...) |
|---|---|---|---|---|---|---|---|
| 03:30:31 | mary | 123.23 | −91.12 | 250.5 | 75 | 150 | ... |
| 03:30:32 | mary | 123.24 | −91.12 | 250.1 | 75 | 150 | ... |
| 03:30:33 | mary | 123.25 | −91.12 | 250.2 | 75 | 150 | ... |

All the activities for all the users of the system can be transferred to performance ranking system 230 this way after each user's individual activities are completed.

Course Determination:

FIG. 4 depicts a flow diagram illustrating one embodiment of a course determination process performed by an embodiment of performance ranking system 230. In this example, process 400 may include receiving user activity data (step 405), normalizing or standardizing the data received (step 410), determining an appropriate course rating and type (step 415), and saving the course data thus determined (step 420). These steps are described in detail below.

Specifically, the performance ranking system may collect and process the route data received from a user device and determine the number of courses on each route. This process may occur after each workout is saved.

The performance ranking system may receive the data file sent from the device as well as an authorization token indicating what person the activity data should be associated with, such as running or biking. The data file may be normalized or standardized by converting each of the individual measurement units to a common base unit. For example, English units may be converted into metric units.

The data can be optimized for storage. For instance, redundant data and outlying data (e.g., statistical aberration, Z-Score greater than 2, etc.) may be removed. Additionally, the data may be compressed for further storage optimization.

The data can then be parsed into a summary description (e.g., total distance, total time, total calories burned, etc.). This summary description is saved in a database record associated with the user. This summary record may be assigned a unique identifier such as a workout ID number. In one embodiment, the unique identifier is a 9-digit integer (e.g., 12345679).

The GPS component of the data is analyzed to determine if and where the route includes one or more courses. This can be done in at least the following three ways.

i) by a climb/descent course auto-generating function. For example, the GPS data may be checked to see if there is a continuous incline or decline for a predetermined distance (e.g., 500 meters) that is at least a certain grade (e.g., 3%). If any section meets this requirement, it is rated according to a climb/descent rating algorithm:

$$points = \frac{difference_{alt}}{25} + \frac{(difference_{alt})^2}{dist.ance} + \frac{dist.ance}{1000} + \frac{elevation_{max}}{500}$$

Difference$_{alt}$=difference between the minimum & maximum elevation for the climb
elevation$_{max}$=maximum elevation for the climb
distance=horizontal distance of the climb The altitude difference, elevation, and distance of the climb may be in meters or feet. In one embodiment, in order for climbs to be rated, they have to be at least 3% grade (elevation/horizontal distance*100) and 500 meters in distance. These "climb rating points" associated with climb ratings (not to be confused with course points used for leaderboards) are used to categorize the climbs. An example is shown in Table 1 below.

TABLE 1

| Category | Climb Rating Points |
| --- | --- |
| HC | >100 |
| 1 | 40-100 |
| 2 | 20-40 |

TABLE 1-continued

| Category | Climb Rating Points |
| --- | --- |
| 3 | 12-20 |
| 4 | 8-12 |
| 5 | 0-8 |

As a specific example, suppose the maximum elevation for a Dam Climb is 320 meters and the minimum elevation is 189 meters. Using the GPS data, it may be determined that a difference in altitude is 1050−620=131 meters and a horizontal distance of the climb is 4828 meters. Thus, 131/25+17161/4828+4828/1000+320/500=5.24+3.55+4.8+0.64=14.23. According to Table 1, the 14.23 climb rating points put the Dam Climb course in Category 3.

ii) by the users explicit 'tagging' of a start and end location using the device interface (for example, similar to the 'lap' button on a GPS watch, the user would click a button to indicate start of a course, and click anther button to indicate end.)

iii) by comparison of existing courses in the system, using the algorithm described in the Course Comparison section below.

In one embodiment, the course is stored in a course scoring system (e.g., course scoring system 243 of FIG. 2). Each stored course may include the subsection of GPS points (a list of latitude and longitude coordinates), a climb/descent rating if applicable, and the course type (which can be (1) user created or auto-generated, (2) "official" (as defined by a manually curated database and set by the system) or (3) as a special event, such as a marathon or bike race).

The normalized data file for the individual activity can be saved into a file system in the performance ranking system with all the other data files, for all activities, for all users. In one embodiment, the summary workout identifier (e.g., 123456789) described above can be used to access this stored time-series data.

Course Scoring:

FIG. 5 depicts a flow diagram illustrating one embodiment of a course scoring process. In one embodiment, course scoring process 500 may be performed by a subsystem (e.g., course scoring system (CSS) 243) of performance ranking system 230 shown in FIG. 2. CSS 243 may include data processing servers and specialized software. Below describes how courses are processed and stored in this subsystem according to course scoring process 500 which, in one embodiment, is performed after each workout is saved.

Course records are added into the CSS (step 505).

As the performance ranking system accumulates routes/courses from users workouts, each individual performance is sorted/slot ranked by course by the duration of the activity for each activity type (e.g., run versus ride) and the final score for a user's activity is determined by ordinal position of the sorted list, which carries a set of points, which are then multiplied a factor determined by the course type. An example is shown in Table 2 below.

TABLE 2

| Course Type | Multiplier |
| --- | --- |
| User Created | ×1 |
| Official | ×2 |
| Event | ×3 |

Example points for climbs are shown in FIG. 7 where course type 700 may have various categories 705, 710, 715, 720, 725, and 730. Example points for descents are shown in FIG. 8 where course type 800 may have various categories 805, 810, 815, 820, 825, and 830. Example points for sprints are shown in FIG. 9. Notice that, in this example, course type 900 and category 730 of course type 700 have the same maximum available points (10 points), since a category 5 climb course is relatively flat as a sprint course.

Additional achievement points (such as guru points) can optionally be added.

The score for the specific activity on the specific course is also saved to the database for that individual user. The dual recordings, per user and per course, can be done by two separate systems (e.g., a CCS and an aggregator, see below) to save processing time.

The performance ranking system may reward users with points for their diligence and consistency (e.g., repeat participations, completion of courses in a workout, a route, a set of courses, a set of routes, etc.). Below is a non-limiting example of how a user's participation and/or efforts can be compared against better (but fewer) performances of another user.

In this example, a user who is ranked first in October 2013 for a particular course has the most total points where Total Points=Time Points (performance based)+Guru points (non-performance based).

Step 1: The performance ranking system ranks users by their average speed in a descending order and rewards time points based on their performances. The person with the fastest speed in the top row is given time points equal to the base point value for the course. Thus, suppose the base point value for the course is 10, the fastest user gets 10 time points. The next fastest user is given the base point value decremented by 1, and so on. This is shown in Table 3 below.

TABLE 3

| Name | Time Points | Times Done | Guru Points | Total Points | Average Speed |
| --- | --- | --- | --- | --- | --- |
| Evan M. | 10 | 1 | 0 | 10 | 21 mph |
| Adam A. | 9 | 2 | 0 | 9 | 20.5 mph |
| Brandon M. | 8 | 4 | 6 | 14 | 19 mph |
| Damon W. | 7 | 3 | 0 | 7 | 18 mph |
| John L. | 6 | 1 | 0 | 6 | 16 mph |

Here, Evan has the fastest time and therefore has the time points of 10. Adam is the next fastest and has 9 time points. Brandon is the next fastest and has 8 points, etc.

Step 2: The performance ranking system determines guru points for individual users. In this example, guru points are available to any user who has done the particular course three or more times and has done it more than anyone else in October 2013. It can be seen from Table 3 that, in this example, Brandon has completed the course the most times (4 times), so Brandon gets 6 guru points, 3 for his third run of the course and 3 for his fourth run of the course.

Step 3: The performance ranking system re-ranks the users and generates leaderboard based on their total points, as shown in Table 4 below.

TABLE 4

| Rank | Name | Time Points | Times Done | Guru Points | Total Points | Average Speed |
| --- | --- | --- | --- | --- | --- | --- |
| 1 | Brandon M. | 8 | 4 | 6 | 14 | 19 mph |
| 2 | Evan M. | 10 | 1 | 0 | 10 | 21 mph |
| 3 | Adam A. | 9 | 2 | 0 | 9 | 20.5 mph |
| 4 | Damon W. | 7 | 3 | 0 | 7 | 18 mph |
| 5 | John L. | 6 | 1 | 0 | 6 | 16 mph |

Here, Brandon has the greatest total points, so he is ranked in the first place even though he is not the fastest. As this example illustrates, a user's participation and/or efforts (which show his diligence, consistency, and commitment) can augment his performances. In this way, the performance ranking system can provide a more "leveled" playing field for users of differing abilities to compete with each other.

Course Score Aggregation:

FIG. 6 depicts a flow diagram illustrating one embodiment of a method for ranking performances of users based on aggregation of course points. In one embodiment, aggregation of course points may be performed by a subsystem (e.g., course point aggregator 245) of performance ranking system 230 shown in FIG. 2. In one embodiment, a subsystem referred to as the Course Aggregator and Leaderboard Generation System (CALGS) may including servers and specialized software implementing the functions of course point aggregator 245 and leaderboard generator 247.

Process 600 may be performed by one embodiment of the CALGS to aggregate course points from the CSS and build and present a leaderboard. Process 600 may be performed on-demand in response to a request for a web page that includes a leaderboard.

Specifically, at step 605, a request may be received, via a networked device (such as a computer, phone, or tablet), from a user requesting a specific leaderboard. The request may include a set of filters (e.g., gender, age, location, time period, etc.).

At step 610, the individual user course points may be read or retrieved from a database associated with each user and summed for each individual user. In one embodiment, the users' course points may be grouped by geographic location (e.g., Austin, Tex.). Alternatively, a leaderboard can also be aggregated from the CSS if it is more efficient to do so.

At step 615, one or more ranking criteria may be determined from the set of filters indicated in the user's request. Examples of ranking criteria may include, but are not limited to, time, geography, age, gender, weight, weight category, power, power/weight ratio, drag coefficient, blood glucose, running economy, estimated $VO_2$ max (peak oxygen uptake or maximal oxygen consumption, referring to the maximum capacity of an individual's body to transport and use oxygen during incremental exercise, which can be expressed as a rate in volume of oxygen per minute), a predefined set of users (e.g., a group of friends, cycling club, corporate challenge, participants of an event, etc.), any measure of physical or athletic fitness, and so on.

At step 620, an aggregate group of course points is slot ranked from the highest to the lowest within a specific time period (e.g., last 90 days, last year, etc.). The sorted list is filtered further by the requested criteria. In one embodiment, this is done per geographic area. In one embodiment, this is done across multiple geographic areas having comparable courses At step 625, the sorted, filtered list of users and their aggregate course points is used to build a leaderboard (or multiple leaderboards that correspond to different ranking criteria). In one embodiment, the leaderboard(s) thus generated can be saved (e.g., in a database) with the meta criteria about how the leaderboard was generated (e.g., location, timeframe, additional filters applied, ranking criteria, etc.). This can enhance performance since identical lists do not need to be generated on demand.

At step 630, the requested leaderboard is transmitted over the network (e.g., the Internet) and presented to the user (e.g., via a website, a smartphone, or any appropriate user device).

Courses Example

The following describes one example of the scoring and aggregation of scores across different courses for different users of the system.

In this example, suppose there are five courses in the hypothetical town of Austin, 3 climbs and 2 sprints (in one embodiment, descents are not used for road cycling).

| Climb | Rating |
|---|---|
| Jester | 1 |
| Mesa | 2 |
| Dam Loop | 3 |

| Sprints | Multiplier |
|---|---|
| Shoal Creek (official) | 2 |
| Littig (user created) | 1 |

In addition, there is an event during the month of July, the Tour of Austin, which contains the Mesa Climb and the Shoal Creek Sprint.

| Event (July 4$^{th}$) |
|---|
| Tour of Austin: contains Mesa Climb and Shoal Creek Sprint |

Athletes (in this example, cyclists) and their point totals for July are as follows.

Joe Athlete: He's one of the fastest riders in Austin, but doesn't try to win any particular leaderboard. He rides each course only once, but is the fastest across each one. Joe achieved the following course points.

| Climb | Rank | Category | Points |
|---|---|---|---|
| Jester | 1 | 1 | 40 |
| Mesa | 1 | 2 | 30 |
| Dam Loop | 1 | 3 | 20 |
| | | Total | 90 |

| Sprint | Rank | Points | Multiplier | Multiplied Points |
|---|---|---|---|---|
| Shoal Creek | 1 | 10 | 2 (official) | 20 |
| Littig | 1 | 10 | 1 (user created) | 10 |
| | | | Total: | 30 |

Climb Crazy Steve: He's not a fast climber, but loves to climb anyway. He sets out to ride the Dam Loop (which is near his house), and racks up points accordingly. He becomes the guru of the dam loop, since he rides over two times and has ridden it the most. So, he gets 3 extra guru points.

| Climb | Rank | Category | Points |
|---|---|---|---|
| Jester | 2 | 1 | 39 |
| Mesa | 2 | 2 | 29 |
| Dam Loop | 2, 3, 4 | 3 | 18, 17, 16, 15, 14, 13 |
| | | Total | 161 + 3 guru points = 164 |

| Sprint | Rank | Points | Multiplier | Multiplied Points |
|---|---|---|---|---|
| Shoal Creek | 5 | 6 | 2 (official) | 12 |
| Littig | 3 | 8 | 1 (user created) | 8 |
| | | | Total: | 20 |

Aero Freddy: He's a big guy, and much better on flats than climbs. He lives near the Littig course, but rides the Shoal Creek course since he can get more points.

| Climb | Rank | Category | Points |
|---|---|---|---|
| Jester | 3 | 1 | 38 |
| Mesa | 3 | 2 | 28 |
| Dam Loop | 2 | 3 | 19 |
| | | Total | 85 |

| Sprint | Rank | Points | Multiplier | Multiplied Points |
|---|---|---|---|---|
| Shoal Creek | 2, 3, 4 | 9, 8, 7 | 2 (official) | 18, 16, 14 |
| Littig | 2 | 9 | 1 (user created) | 9 |
| | | | Total: | 57 |

Tour of Austin (Event=3× points)

| Mesa (Climb) | Racer | Points | Shoal Creek (Sprint) | Racer | Points |
|---|---|---|---|---|---|
| 1$^{st}$ place | Joe Athlete | 40 | 1$^{st}$ place | — | 30 |
| 2$^{nd}$ place | — | 37 | 2$^{nd}$ place | — | 27 |
| 3$^{rd}$ place | A. Freddy | 34 | 3$^{rd}$ place | — | 24 |

In the Tour of Austin, Joe Athlete wins the climb up Mesa, and accrues a lot of points. But Aero Freddy also gets some points by placing third. Here, the second place and all of the Shoal Creek points are taken up by riders from out of town.

Based on the above data, the July Leaderboards may be as follows:

Dam Loop

| Ranking | Rider | Points |
|---|---|---|
| 1st | Climb Crazy Steve | 93 + 3 = 96 |
| 2nd | Joe Athlete | 20 |
| 3rd | Aero Freddy | 16 |

Because Steve rides the Dam Loop climb the most (6 times), he sits atop the monthly leaderboard, even though Joe Athlete and Aero Freddy have faster times.

Austin: Climb King

| Ranking | Rider | Points |
| --- | --- | --- |
| 1st | Climb Crazy Steve | 164 + 0 = 164 |
| 2nd | Joe Athlete | 90 + 60 = 150 |
| 3rd | Aero Freddy | 82 + 57 = 139 |

Climb Crazy Steve won the climb king for Austin. But, the point difference is much smaller. If Joe Athlete would complete more climbs and more often, he could easily surpass Steve.

Austin Sprint King

| Ranking | Rider | Points |
| --- | --- | --- |
| 1st | Aero Freddy | 57 |
| 2nd | Joe Athlete | 30 |
| 3rd | Climb Crazy Steve | 20 |

Aero Freddy wins the Sprint King award, not just by high placings on sprint leaderboards, but repeated awards on official sprints, which are worth twice as much as user-defined sprints.

Course Comparison. Comparing a user's course and performance over a course to different courses can potentially be computationally intense and involves significant technological involvement. A course can be compared to a database of courses in order to determine "relative" performance of a user on one course against a user on another course (or a user's aggregation of performance over a set of courses to another user's aggregate performance over one or more courses). In one embodiment, this process is involves comparing the list of the GPS points of the current user's route:

$$R=\{r_1, r_2, r_3, r_i, \ldots, r_N\}, r_i=\{lat_i, long_i\}$$

with the course GPS points:

$$Cj=\{c_{j1}, c_{j2}, c_{j3}, c_{ji}, \ldots, rjN\}, c_i=\{lat_i, long_i\}$$

where N is the number of courses (which is over 10,000 and growing) and N is the total number of GPS points. The following describes one embodiment in greater detail.

Figure 10A:
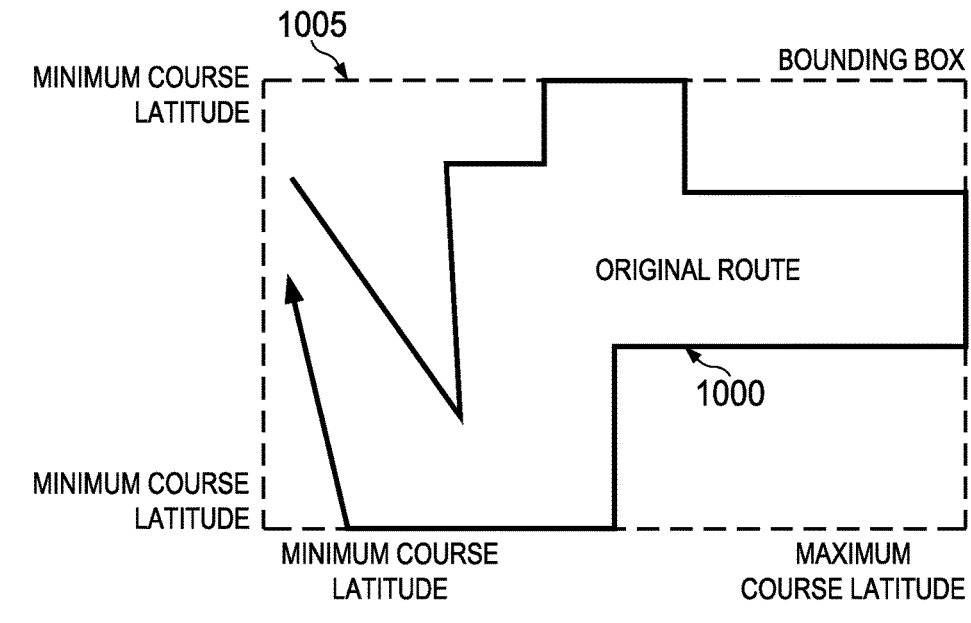
FIG. 10A illustrates one embodiment of "bounding box" of GPS points.

1) The first step is to efficiently obtain a smaller list of potential candidate courses. To find this list, a bounding box must encompass the latitude and longitude for beginning and end points of Cj (cj1 & cjN) for all courses (e.g., bounding box 1005 formed by the minimum and maximum of the latitude and longitude coordinates of original route 1000 shown in FIG. 10A).

Figure 10B:
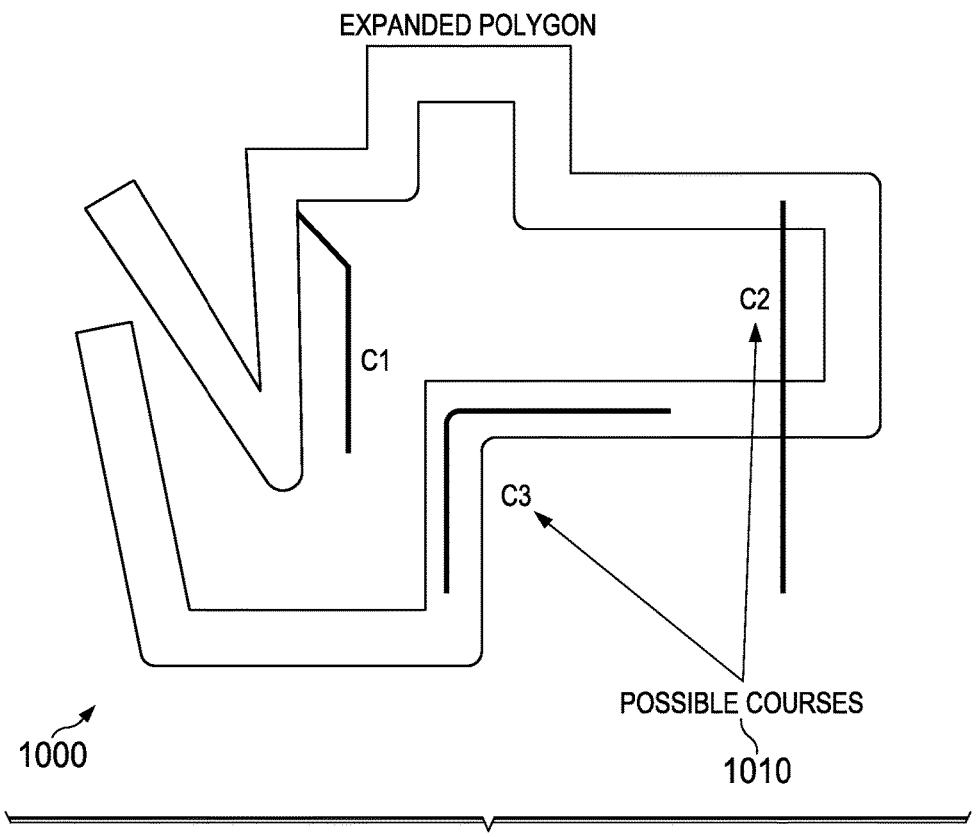
FIG. 10B illustrates potential courses being evaluated by their inclusion within a polygon.

2) From the reduced set of courses, each course is compared using an algorithm (e.g., one that uses the Shapely BSD-licensed Python package). First, the route is expanded into a polygon using the "shapely.buffer" method from the GPS points after converting them to a line string. Then all of the GPS points (Cj) are determined to be within the polygon, using the Shapely polygon object ".within( )." If some percentage (e.g., 80% in one embodiment, 100% in another) of a courses points lie within the route polygon, then the course remains in the candidate list, and is otherwise thrown out (see, e.g., possible courses 1010 in route 1000 shown in FIG. 10B).

3) A couple "clean up" steps may be performed before the final list is generated. For example, directionality of each of the courses may be compared to the route (the GPS points of the start and finish are in the same order). Additionally, redundant courses (courses that exists within another course) may be eliminated using an algorithm such as one described above with regard to step 2.

In one embodiment, only after all 3 steps are performed can a course be declared to exist on a user's route.

While different users may each have ridden their bikes across different routes, a particular section or "course" can be defined as an interesting feature that is common to each route, for instance, a climb. In one embodiment, a climb course that has been defined within an embodiment of a performance ranking system disclosed herein can be accessible by all users of the performance ranking system. FIG. 11 illustrates by example how individual users (e.g., Adam A and Evan M in this example) may achieve points over different courses according to some embodiments disclosed herein.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments of the invention described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for scoring a route, comprising:
    collecting a plurality of data relating to a user's traversal of said route, said collected data comprising at least one of: a minimum elevation of said route, a maximum elevation of said route, and a distance of said route;
    utilizing said collected data to determine whether said route is substantially ascending, substantially descending, or neither, wherein said act of utilizing said collected data to determine whether said route is substantially ascending, substantially descending, or neither comprises:
    determining whether a difference between said minimum elevation and said maximum elevation exceeds a threshold;
    when said threshold is not met, indicating that said route is neither substantially ascending nor substantially descending;
    when said threshold is met or exceeded, comparing a time stamp data associated with said minimum elevation to time stamp data associated with said maximum elevation;
    when said time stamp of said minimum elevation precedes said time stamp for said maximum elevation, indicating that said route is substantially ascending; and
    when said time stamp of said maximum elevation precedes said time stamp for said minimum elevation, indicating that said route is substantially descending;
    when it is determined that said route is substantially ascending or substantially descending, performing a mathematical calculation with respect to said collected data comprising:
    dividing a difference between said minimum and said maximum elevation of said route by a first constant to arrive at a first value;
    dividing a difference between said minimum and said maximum elevation of said route squared by said distance of said route to arrive at a second value;
    dividing said distance of said route by a second constant to arrive at a third value; when said route is substantially ascending, dividing said maximum elevation by a third constant to arrive at a fourth value;
    when said route is substantially descending, dividing said minimum elevation by said third constant to arrive at a fifth value; and
    adding said first, second, third, and fourth or fifth values to arrive at a route value; and
    comparing said route value to a table in order to determine a route difficulty category of said route, said table comprising an association of a plurality of route value ranges to a respective plurality of route difficulty categories.

2. The method of claim 1, wherein said collected data further comprises: a time of completion of said route and a type of activity.

3. The method of claim 2, wherein said type of activity comprises at least one of: cycling and/or running.

4. The method of claim 2, wherein each of said plurality of route difficulty categories is associated with a user point award system and said method further comprises:
    comparing said time of completion of said route by said user to respective completion times of a plurality of other users having a same activity type as that of said user in order to determine a rank of said user; and
    awarding points to said user based on said rank in accordance with said user point award system associated with said route difficulty category of said route.

5. The method of claim 4, further comprising generating a leaderboard for display to said user, said leaderboard including a plurality of users arranged in order by said point awards, wherein said collected data is received from a GPS-enabled mobile device carried by the user, the GPS-enabled mobile device comprising a GPS receiver, a display, a microprocessor, and a wireless communication transceiver coupled to the GPS receiver, wherein said leaderboard is displayed on the display of said GPS-enabled device.

6. The method of claim 5, wherein said leaderboard is updated periodically.

7. A method for ranking a plurality of users traversing a respectively plurality of disparate courses against one another, said method comprising:
    for each of said plurality of users, collecting data relating to said traversal from a mobile tracking device carried by said user, said data comprising at least one of: terrain data relating to a course which was traversed, and a time of completion of said course which was traversed, wherein said terrain data comprises: a minimum elevation of said course which was traversed, a maximum elevation of said course which was traversed, and a distance of said course which was traversed;

assigning one of a plurality of difficulty levels to at least a portion of each course which was traversed based at least in part on said terrain data, wherein said act of assigning one of said plurality of difficulty levels comprises:

comparing a time stamp of said maximum elevation and said minimum elevation to determine whether said route is substantially ascending, substantially descending, or neither;

when it is determined that said route is substantially ascending or substantially descending, calculating a mathematical formula with respect to said collected data comprising: dividing a difference between said minimum and said maximum elevation of said route by a first constant to arrive at a first value;

dividing a difference between said minimum and said maximum elevation of said route squared by said distance of said route to arrive at a second value;

dividing said distance of said route by a second constant to arrive at a third value;

when said route is substantially ascending, dividing said maximum elevation by a third constant to arrive at a fourth value;

when said route is substantially descending, dividing said minimum elevation by said third constant to arrive at a fifth value; and adding said first, second, third, and fourth or fifth values to arrive at a route value; and comparing said route value to a table in order to determine a route difficulty category of said route, said table comprising an association of a plurality of route value ranges to a respective plurality of route difficulty categories;

for each one of said plurality of difficulty levels, ranking each of those ones of said plurality of users which traversed a course assigned to said difficulty level based on said time of completion thereof;

awarding a first set points to individual ones of said plurality of users according to said act of ranking and said difficulty category;

awarding a second set points to individual ones of said plurality of users based on one or more non-performance related metrics;

for each of said plurality of users, adding said first set of points and said second set of points to generate a total point value therefor; and generating a leaderboard including individual ones of said plurality of users having highest total point values.

8. The method of claim 7, wherein said traversal comprises cycling.

9. The method of claim 7, wherein said traversal comprises running.

10. The method of claim 7, wherein said one or more nonperformance related metrics comprise at least one of:
a number of times an individual one of said plurality of users has traversed said course which was traversed, whether said course which was traversed is user entered, and whether said course which was traversed is a validated course.

11. The method of claim 7, wherein said act of assigning one of said plurality of difficulty levels further comprises comparing said terrain data to terrain data of a library of validated courses to determine a reasonably comparable course.

12. The method of claim 11, wherein said act of comparing further comprises:

creating a rectangle to encompass said terrain data, said rectangle having four sides, each of said sides being derived from said data such that a first side is positioned to align with an eastern-most coordinate, a second side is positioned to align with a western-most coordinate, a third side is positioned to align with a northern-most coordinate, and a fourth side is positioned to align with a southern-most coordinate;

determine a subset of a set of predetermined courses which have coordinates that are within said rectangle;

comparing said subset to a polygon derived from said coordinates of said terrain data to determine whether a threshold amount of said coordinates of said predetermined courses are within said polygon; and based on said comparison, identifying individual ones of said predetermined courses which are associated to said course which was traversed.

13. A non-transitory computer readable apparatus comprising a plurality of instructions which are configured to when executed by a processor, cause the processor to:

for each of a plurality of users carrying a mobile tracking device and traversing a respectively plurality of disparate courses against one another, collect data relating to said traversal from said mobile tracking device, the data including: (i) terrain data comprising at least one of: a minimum elevation of said course which was traversed, a maximum elevation of said course which was traversed, and a distance of said course which was traversed, and (ii) time of completion;

assign a difficulty level to at least a portion of each of said courses which was traversed based at least in part on said terrain data, wherein said assignment of said difficulty level further comprises:

comparison of a time stamp of said maximum elevation and said minimum elevation to determine whether said route is substantially ascending, substantially descending, or neither:

when it is determined that said route is substantially ascending or substantially descending, perform the following calculation;

divide a difference between said minimum and said maximum elevation of said route by a first constant to arrive at a first value;

divide a difference between said minimum and said maximum elevation of said route squared by said distance of said route to arrive at a second value;

divide said distance of said route by a second constant to arrive at a third value;

when said route is substantially ascending, divide said maximum elevation by a third constant to arrive at a fourth value;

when said route is substantially descending, divide said minimum elevation by said third constant to arrive at a fifth value; and add said first, second, third, and fourth or fifth values to arrive at a route value; and determine a route difficulty category of said route via comparison of said route value to a table, said table comprising an association of a plurality of route value ranges to a respective plurality of route difficulty categories;

for each difficulty level, rank each of those ones of said plurality of users which traversed a course assigned to said difficulty level based on said time of completion;
award a first set points according to said act of ranking;
award a second set points based on one or more non-performance related metrics;
add said first set of points and said second set of points for each of said plurality of users to generate a total point value therefor;
generate a leaderboard based on said total point values; and
display said leaderboard on a display of the mobile tracking device.

14. The computer readable apparatus of claim 13, wherein said traversal comprises at least one of: cycling or running.

15. The computer readable apparatus of claim 14, wherein said one or more nonperformance related metrics comprise at least one of: a number of times an individual one of said plurality of users has traversed said course which was traversed, whether said course which was traversed is user entered, and whether said course which was traversed is a validated course.

16. The computer readable apparatus of claim 14, wherein said assignment said plurality of difficulty levels further comprises a comparison of said terrain data to terrain data of a library of validated courses to determine a reasonably comparable course.

17. The computer readable apparatus of claim 16, wherein said comparison further comprises:

creation of a rectangle to encompass said terrain data, said rectangle having four sides, each of said sides being derived from said data such that a first side is positioned to align with an eastern-most coordinate, a second side is positioned to align with a western-most coordinate, a third side is positioned to align with a northern-most coordinate, and a fourth side is positioned to align with a southern-most coordinate;

determination of a subset of a set of predetermined courses which have coordinates that are within said rectangle;

comparison of said subset to a polygon derived from said coordinates of said terrain data to determine whether a threshold amount of said coordinates of said predetermined courses are within said polygon; and based on said comparison, identification of individual ones of said predetermined courses which are associated to said course which was traversed.

18. The method of claim 7 wherein said mobile tracking device is a GPS-enabled mobile device carried by said user, the GPS-enabled mobile device comprising a GPS receiver, a display, a microprocessor, and a wireless communication transceiver coupled to the GPS receiver, the method further comprising displaying the leaderboard on said GPS-enabled mobile device.

* * * * *